United States Patent [19]
Downey

[11] 3,782,262
[45] Jan. 1, 1974

[54] MOTION PICTURE PROCESSING AND PROJECTION SYSTEM EMPLOYING MULTI-PURPOSE CASSETTE

[75] Inventor: Roger B. Downey, Lexington, Mass.

[73] Assignee: Polaroid Corporation, Cambridge, Mass.

[22] Filed: Oct. 23, 1970

[21] Appl. No.: 83,593

Related U.S. Application Data

[62] Division of Ser. No. 761,771, Sept. 23, 1968, Pat. No. 3,597,062.

[52] U.S. Cl. .................... 95/89 R, 222/80, 352/130
[51] Int. Cl. ............................................. G03d 3/08
[58] Field of Search .................... 95/89 R, 90.5, 96, 95/97, 98; 222/80, 94; 352/130

[56] References Cited
UNITED STATES PATENTS

| | | | |
|---|---|---|---|
| 1,928,235 | 9/1933 | Taylor | 95/94 R |
| 2,385,681 | 9/1945 | Brick | 95/94 R |
| 2,971,445 | 2/1961 | Orlando | 95/89 R X |
| 3,202,072 | 8/1965 | Limberger | 95/89 R |
| 3,273,485 | 9/1966 | Limberger | 95/89 R |
| 2,173,528 | 9/1939 | Beale | 128/268 UX |

*Primary Examiner*—Fred L. Braun
*Attorney*—Brown & Mikulka

[57] ABSTRACT

A motion picture system utilizing a cassette having two releasably connected sections. In one section respective ends of a strip of film are permanently attached to reels for reversible transport across a film gate, while the other section contains development fluid. Initially, when the two sections are connected together, the cassette is adapted to be positioned in a camera for exposure purposes. Subsequently, the two sections are separated and mounted independently in a unique projector in which the film is sequentially and simultaneously developed, by passing a loop thereof drawn from the film gate of the first section through the developing fluid contained in the second section, dried and projected through an appropriate optical system. Specially devised features are employed in the projector to release the development fluid from a sealed container into a reservoir section of the developing section of the cassette, to draw the loop of film from the film gate of the first section and insert the loop into the reservoir of development fluid, to dry the developed film and to subsequently retain the development fluid in a safe manner.

3 Claims, 6 Drawing Figures

MOTION PICTURE PROCESSING AND PROJECTION SYSTEM EMPLOYING MULTI-PURPOSE CASSETTE

This is a division of copending application Ser. No. 761,771, filed Sept. 23, 1968, now U.S. Pat. No. 3,597,062.

BACKGROUND OF THE INVENTION

1. Field of Invention

This invention relates to motion picture photography and, more particularly, to improved apparatus for simplified and rapid exposure, processing, projection and editing of motion picture film.

2. Description of the Prior Art

Traditionally, motion picture photography for home use has involved the following procedures:

1. Unexposed film is procured by a user.
2. The user threads the film from a reel through the mechanism of a camera and then exposes the film as desired.
3. The exposed film is mailed to a processing laboratory.
4. The laboratory processes the film, repackages it on a reel and returns it to the user.
5. The user then mounts the reel in a projector, threads it through a mechanism of the projector to a take-up reel permanently retained therein and then projects it onto a screen.

The extended delay normally incurred between the time the exposed film is mailed to a laboratory and returned ready for viewing has proved to be a significant inconvenience to the user and a source of great annoyance.

Certain important improvements have been made in recent years to simplify the job of home motion picture photography. For example, cassette systems are now available which are adapted to be quickly mounted as a unit into a camera for exposure purposes. After the film has been exposed, the cassette containing the film can be quickly removed from the camera and mailed to a processing laboratory.

Even more recently, specially designed projectors have been marketed which utilize quick mounting cassettes containing the developed film. These systems not only greatly ease the job of projecting the film, but also provide a permanent storage container for the film, i.e., the cassette, from which it is never necessary to withdraw the film for projection purposes.

However, neither of these significant improvements has solved the major inconvenience associated with home motion picture photography, i.e., the time delay between the taking of the film and its availability for projection. Additionally, while camera cassettes simplify the procedures for loading film into and removing film from a camera, they do not simplify the multi-step laboratory development process which still requires repackaging of the film for projection purposes. Further, accessibility to film packaged in commercially available projector cassettes for the purpose of editing has not proved generally satisfactory.

The field of still photography is no longer hampered by extensive periods of delay between the time a picture is taken and the time when the finished product can be enjoyed. The impact on the public of the one-step photographic process employing diffusion transfer techniques is a matter of record and generally well known. The home photographer can now see the fruits of his efforts in a matter of seconds. This important convenience has been available to the still photographer for many years. However, his fellow hobbyist, interested in motion pictures, has had until now to wait a matter of days and even, in some instances, weeks before he could see the results of his work. The motion picture arts have lacked a simplified exposing, processing and projecting system which can be operated by any amateur photographer and which assures quick and easy access to and projection of fully developed film.

In commercial and industrial operations such a rapid processing and projection system will not only prove to be an improvement as a matter of convenience, but will have other important effects as well. For instance, motion picture newsreel programs can now be presented on television to the viewing public shortly after events of interest have occurred and been photographed.

This invention overcomes the above noted limitations of heretofore devised motion picture systems and provides a system which is readily usable by even amateur photographers to easily and quickly expose, process, project and edit film.

It is therefore a primary object of this invention to provide a compact motion picture cassette which can be utilized in both a camera and projector.

A further object of this invention is to provide a motion picture cassette in which the developing chemicals are safely and permanently stored.

Another object of this invention is to provide a motion picture cassette in which the film is permanently retained during exposure, processing, projection and editing procedures.

An additional object of this invention is to provide a motion picture projector in which exposed film can be processed.

Still another object of this invention is to provide a motion picture projector in which film can be sequentially and simultaneously processed and exposed.

A still further object of this invention is to provide a simple and efficient mechanism for drawing a loop of film from a cassette for purposes of developing latent images recorded thereon.

Also, an object of this invention is to provide a motion picture projector in which a cassette containing development fluid can be mounted such that the development fluid is never permitted to constitute a hazard.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

SUMMARY OF THE INVENTION

Figure 1:
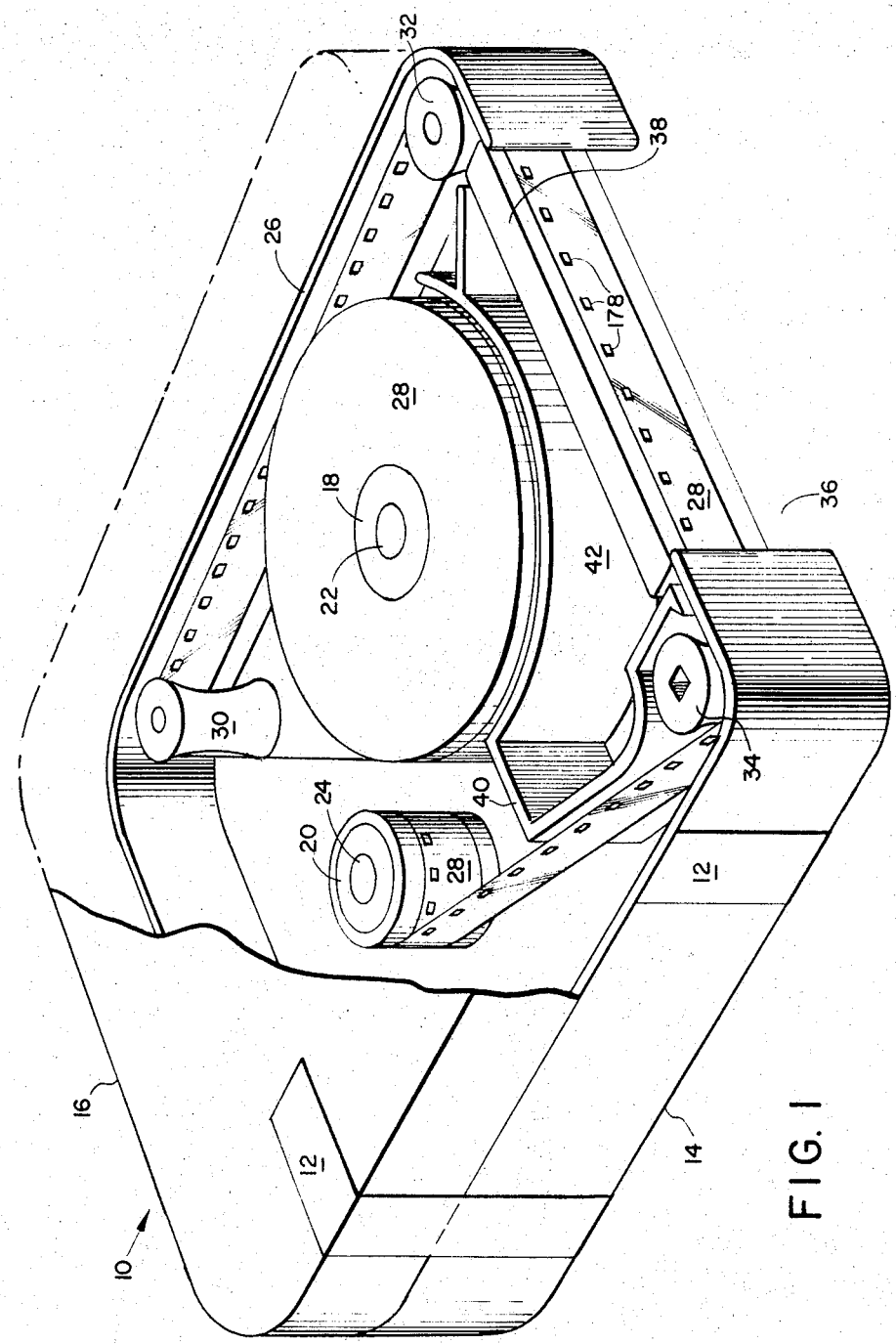
FIG. 1 is a perspective view of a motion picture film cassette embodying features of this invention.

The preferred embodiment of this invention briefly comprises a compact cassette constituted by two releasably connected sections. The first section is provided with a film gate and contains reel means, to which the ends of a motion picture film strip are permanently attached and which, further, are adapted to reversibly transport the motion picture film across the film gate when connected to appropriate external drive means. In the second section of the cassette, development chemicals for the film are initially stored in a crushable container from which they can be subsequently released into a reservoir area of that section. Access means into the reservoir area are provided and an absorption material is positioned adjacent that area.

The cassette, with the two separable sections connected together, is adapted to be utilized in a motion picture camera for exposure purposes. After the film has been exposed in the camera, the two sections may be separated and mounted individually in a specially devised projector.

A recess provided in the housing of the first section of the cassette is adapted to receive a mirror of the projector behind that portion of the film strip disposed across the film gate when this cassette section is mounted in the projector. Also, two slidably mounted idlers of the projector are operable to draw a loop of the film from the film gate and to position it, through the access means of the developing section of the cassette, in the reservoir area and thence through a film drying station of the projector.

A solenoid in the projector can then be energized to crush or puncture the container in which the development fluid is initially stored. The development fluid is then free to flow into the reservoir area wherein it is in operative relationship with the film. At this time the absorption material is disposed above the development fluid in the reservoir area.

The loop of film returns from the drying station to the film gate of the film handling section of the cassette. On its return to the reel means, it comes into operable relationship with the optical system of the projector which includes the aforementioned mirror positioned behind the film strip in the recess of the film handling section of the cassette.

Drive means of the projector engage the reel means of the film handling section of the cassette such that the loop of film is drawn from a supply reel through the development fluid, through the drying station, through the optical system whereby it may be projected on an appropriate screen and thence onto a take-up reel in the film handling section of the cassette. After this operation has once been performed, the slidably mounted idlers of the projector can be manipulated to permit the film to return to its initial position across the film gate. The drive means of the projector can be operated in a reverse direction to return the film from the take-up reel to the supply reel. Subsequent viewings of the film can be effected by operating the projector in the conventional, i.e., projection only, mode.

The means of the projector for receiving the developing section of the cassette are rotatably mounted. Consequently, after the film strip has been processed and the film loop returned to its original position across the film gate, the film developing section can be rotated to bring the developing fluid in the reservoir area into contact with the absorption material. Thus, the developing fluid will be thereafter permanently retained by the absorption material within this section of the cassette. This section of the cassette can then be disposed of and the developed film permanently retained in the other section of the cassette for storage and subsequent projection purposes.

Editing of the film can readily be accomplished by withdrawing a loop including the section of interest from the film gate and removing sections thereof and/or adding sections thereto.

DESCRIPTION OF THE PREFERRED EMBODIMENT

A currently preferred embodiment of this invention makes use of a film structure which comprises a photosensitive negative emulsion and an image-receiving layer to which a positive image may be transferred by diffusion during development without necessitating the subsequent removal of the emulsion containing its developed negative image. This highly desirable feature is made possible by a developed negative image having low covering power.

In typical silver transfer-reversal processes for the production of black-and-white images, a silver halide developer and a silver halide solvent are applied in an aqueous alkaline solution to a photoexposed silver halide stratum or emulsion, where they develop exposed silver halide to silver and react with unreduced silver halide to form a soluble silver complex. This complex, in order to form a positive print, is transferred and reduced to silver on a silver-receptive stratum upon which the silver halide stratum has been superposed. It has generally been the practice, in the completion of this process, to separate the silver-receptive and silver halide strata in order to render the positive print visible.

However, as indicated above, the positive print may be rendered visible without separation of the silver halide and silver-receptive strata. For example, the silver-receptive stratum may be so constituted as to provide an unusually vigorous silver precipitating environment which causes the silver deposited upon it, in comparison with silver developed in the silver halide stratum, to possess very high covering power, i.e., opacity for a given mass of reduced silver. If the silver halide is in such a concentration as to give rise only when fully developed to a predetermined low maximum density, and if the silver complex is reduced to silver in a vigorous silver precipitating environment, the resulting negative and positive prints in super-position provide a composite print that presents a good image for projection purposes as long as they are contained on a transparent support. Since the silver halide stratum and the silver-receptive stratum may not be separated, an overall simplification of the silver transfer-reversal process is achieved.

A composite film assembly of this type as well as processing compositions for producing a fully developed black-and-white image without the necessity of removing the developed negative image after processing are shown in prior U.S. Pat. No. 2,861,885 of Edwin H. Land which issued on Nov. 25, 1958. Other composite film assemblies capable of producing developed full-color images without the necessity of removing the developed emulsion are shown in prior U.S. Pat. of Edwin H. Land Nos. 2,726,154 issued Dec. 6, 1955 and 2,944,894 issued July 12, 1960. It should be noted that the present invention is not directed to the chemistry by which images are developed in the photosensitive emulsion and transferred to an image-receiving stratum. However, in the practice of this invention, whether the film employed is black-and-white film or color film, it is preferably of a type not requiring the removal of the negative emulsion after it is developed.

Referring now to FIG. 1 of the drawings, a motion picture film cassette 10 is shown which can be utilized in exposing, processing, projecting and editing operations. The cassette 10 is constituted by two separate sections releasably connected together by strips of tape 12. A first section 14 may be considered the film handling section, while a second section 16 may be considered the film developing section.

The film handling section 14 may advantageously take the form of the film handling sections of the cassettes described in copending applications Ser. No. 761,756 of Gerald H. Cook filed Sept. 23, 1968, now issued as U.S. Pat. No. 3,584,944 and Ser. No. 783,242 of Rogers B. Downey filed Dec. 12, 1968, now issued as U.S. Pat. No. 3,584,942. both of which applications are assigned to the assignee of the present invention. As illustrated in FIG. 1, it contains a supply reel 18 and a take-up reel 20 mounted on parallel pins 22, 24, respectively, for rotation within its housing 26.

Respective ends of a strip 28 of motion picture film of the type previously described are permanently affixed to the supply reel 18 and the take-up reel 20. The film strip 28 in unexposed condition is initially coiled on the supply reel 18 and passes around idlers 30, 32, 34, in reaching the take-up reel 20. In traveling from idler 32 to idler 34, the film strip 28 traverses a film gate 36 provided in the housing 26. Removably positioned behind the film strip 28 and the film gate 36 is a pressure plate 38 which provides support for the film during exposure operations.

As will be explained in more detail in connection with the description of FIG. 2 of the drawings, the reels 18, 20 are appropriately arranged such that they can be connected to drive means external to the cassette 10 and rotated in either direction. The film handling section 14 thus includes reel means which can be connected to external drive means to cause the film strip 28 to be reversibly transported across the film gate 36.

A portion 40 of the housing 26 is configured to provide a recess 42 behind the film 28 as it traverses the film gate 36. It will be noted that the pressure plate 38 initially partially occupies this recess 42. Accessibility into the film handling section 14 behind the film strip 28 is therefore provided for purposes which will subsequently become apparent.

The cassette 10, with its first section 14 connected to its second section 16 by the strips of tape 12, is configured so as to be adapted for quick mounting in a motion-picture camera (not shown). During the motion picture taking process, the reel means of the film handling section 14 engage the drive means of the camera such that the film strip 28 is transported across the film gate 36 from the supply reel 18 onto the take-up reel 20. Latent images are thereby recorded on the film strip.

Subsequent to the exposure process, the cassette 10 is withdrawn from the camera and its two sections 14 and 16 separated by removing the strips of tape 12. These sections 14, 16 of the cassette 10 are then adapted to be individually mounted in a projector 44 (See FIG. 2). In effect, the housing of the projector 44 consists of a frame member 46 enclosed by a rear panel 48 and a front panel 50. Hinged to, and forming part of, the front panel 50 is a door 52.

Figure 2:
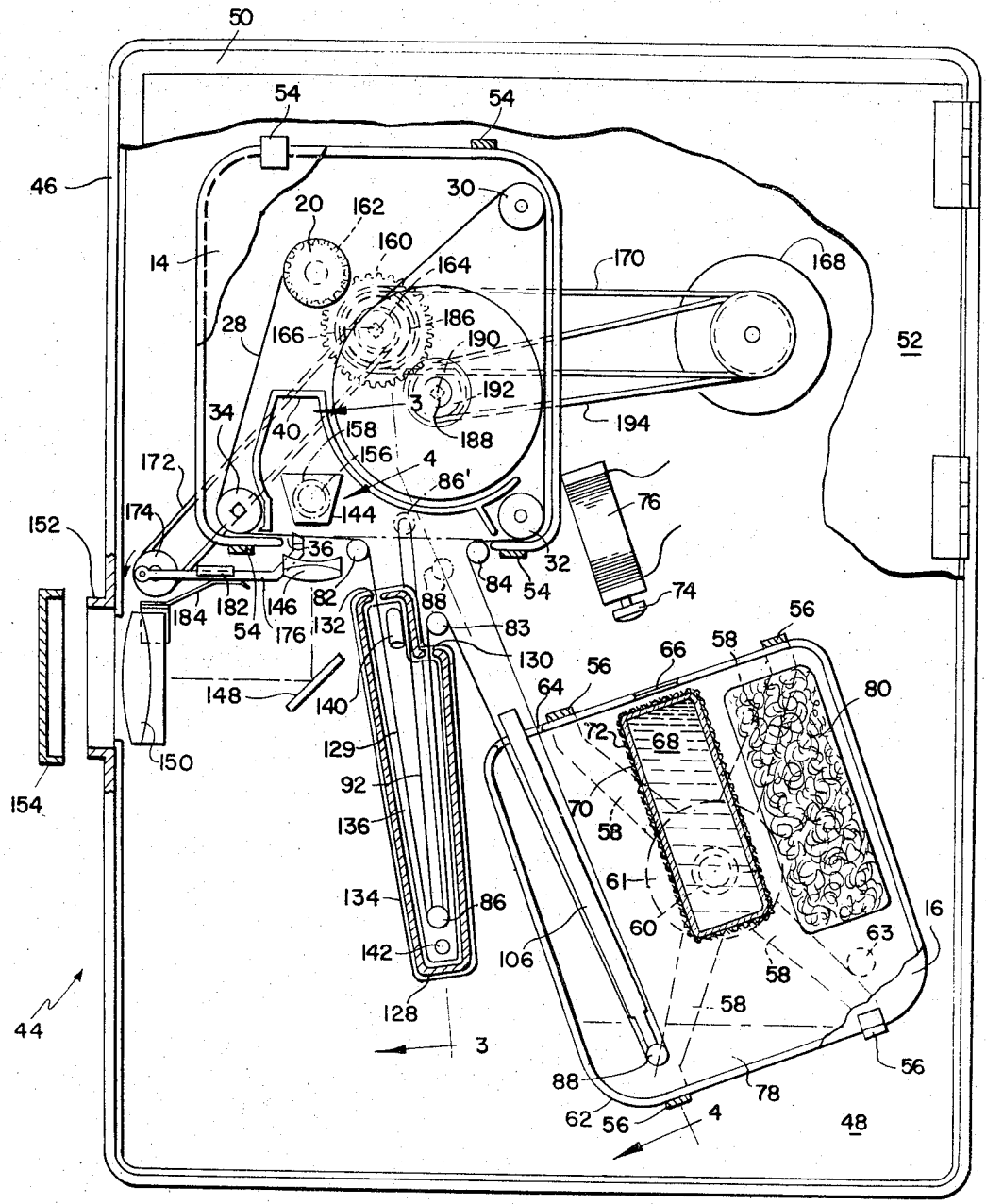
FIG. 2 is a side elevation view partially in section of a projector embodying features of this invention and in which the separate sections of the cassette illustrated in FIG. 1 are mounted.

As best seen in FIG. 2, the film handling section 14 of the cassette 10 is adapted to be mounted in spring clamps 54 which extend inwardly from the rear panel 48. Similarly, the film developing section 16 of the cassette 10 is adapted to be mounted in spring clamps 56 of the projector 44. However, in this latter instance, the spring clamps 56 are formed on or connected to the ends of spokes 58 extending radially from a hub 60. This hub 60 is rotatably mounted from the rear panel 48 of the projector 44 and operable by movement of a hand knob 61 (See FIG. 5). As shown in FIG. 2, when initially mounted in the projector 44, one corner 62 of the developing section 16 is disposed below the other corners thereof. A pin 62 extending from the rear panel 48 and located between adjacent spokes 58, acts as a stop to limit the degree of rotation of the film developing section 16 in either direction within the projector 44.

The developing section 16 of the cassette 10 is provided with an aperture 64 and a recessed or weakened portion 66 for purposes to be more fully explained. Alternately, the aperture 64 may also take the form of a recessed or weakened portion of the developing section 16. Development chemicals 68, suitable for processing the film strip 28 after it has been exposed, are initially retained in a container 70. This container 70 may be formed of any suitable crushable or rupturable material compatible with the development chemicals 68 themselves. For instance, the container 70 may be formed of a lead sheathed plastic material or, as in the embodiment illustrated in the drawings, in a frangible glass vial. In the latter instance, the glass vial container 70 is enclosed by a woven mesh of material 72 such as cotton or nylon.

Mounted from the rear panel 48 so as to be positioned over the recessed or weakened portion 66 of the film developing section 16 is a plunger 74 driven by a solenoid 76. It will thus be recognized that, when the solenoid is energized, the plunger 74 will break through the weakened portion 66 of the film developing section 16 and crush the frangible glass vial container 70, thereby permitting the development fluid or chemicals 68 to flow through the woven mesh of material 72 into a reservoir area 78 of the cassette's development section 16. By initially mounting the film developing section 16 in the tilted position shown in FIG. 2, a reservoir area 78 of greater depth is obtained than would be possible if the section were mounted with the bottom of the reservoir aligned horizontally.

Also positioned within the film developing section 16 is a pad of absorption material 80, such as cotton, which is disposed above the development chemicals 68 when they are retained in the reservoir area 78. It will be appreciated that subsequent rotation of the hub 60 in a clockwise direction, as viewed in FIG. 2, will cause the development chemicals 68 to come into contact with and be absorbed by the absorption material 80.

After the pressure plate 38 has been removed from the film handling section 14 of the cassette 10 and this section initially mounted in the projector 44, the portion of the film strip 28 extending across the film gate 36 is positioned above three idlers 82, 83, 84 which are rotatably mounted from the rear panel 48 of the projector. Also a pair of slidable idlers 86, 88 extending from the rear panel 48 and door 52, respectively, of the projector 44 are initially positioned above and below, respectively, this section of the film strip 28. The fully extended positions to which these idlers 86, 88 can be caused to move, in a manner to be described, are illustrated in FIG. 2, while their initial positions are shown in phantom in the same figure and designated 86' and 88', respectively.

Figure 3:
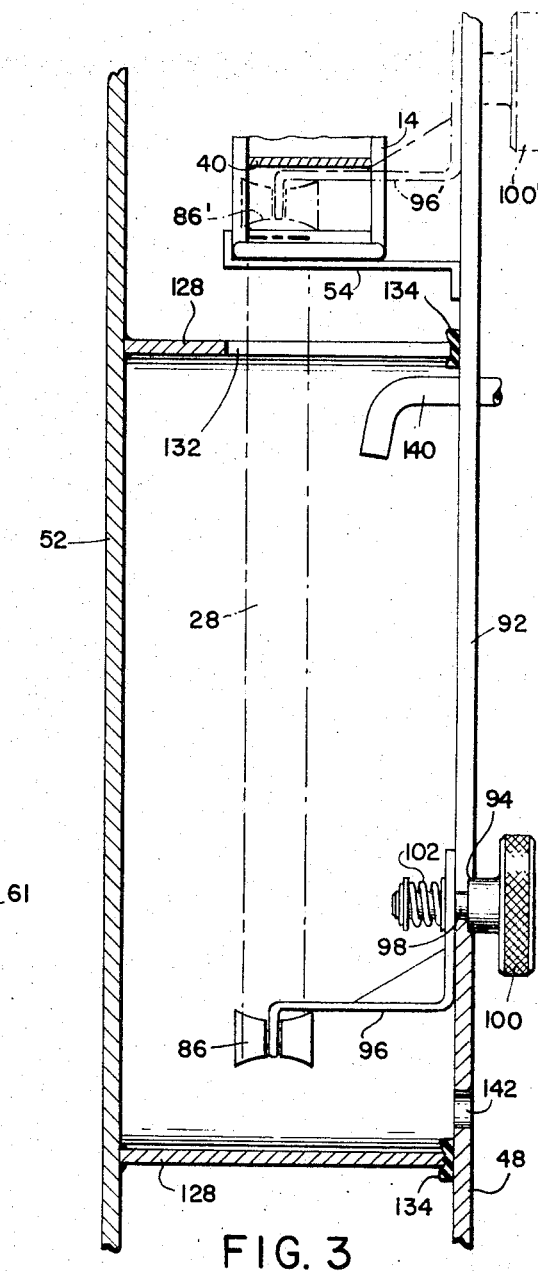
FIG. 3 is a view of the film drying station of the projector taken along line 3—3 of FIG. 2.
Figure 5:
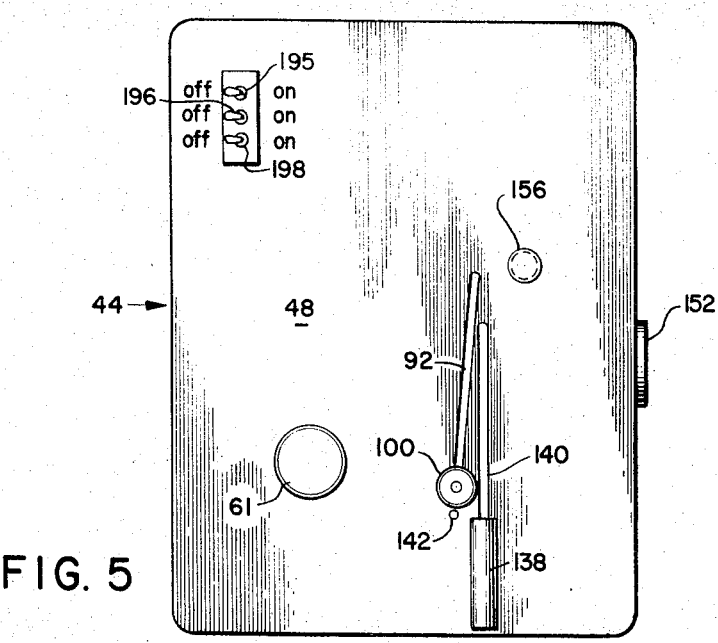
FIG. 5 is an elevation of the back side of the projector as illustrated in FIG. 2.

As may best be seen in FIGS. 3 and 5, the rear panel 48 of the projector 44 is provided with a slot 92 and a recess 94 communicating therewith. The idler 86 is rotatably mounted from one end of an arm 96, which positions the idler in substantially the same plane with the film strip 28. The other end of the arm 96 slidably receives a pin 98 which also passes through the slot 92. One end of the pin 98 is provided with a hand knob 100 adapted to seat in the recess 94, while its other end is provided with a spring 102 which continually urges the pin and hand knob assembly inwardly of the projector 44. The hand knob 100 can thus be manipulated to displace the idler 86 between a first position (shown in phantom in FIGS. 2 and 3) and a second or fully extended position. As previously indicated, when the idler 86 is in its initial position, it is located within the recess 42 of the cassette's film handling section 14 and behind the film strip 28 extending across the film gate 36. As the hand knob 100 is moved from its initial position to its fully extended position, the idler engages the film strip 28 and draws a loop thereof from the film gate 36 over and between the idlers 82 and 83.

Figure 4:
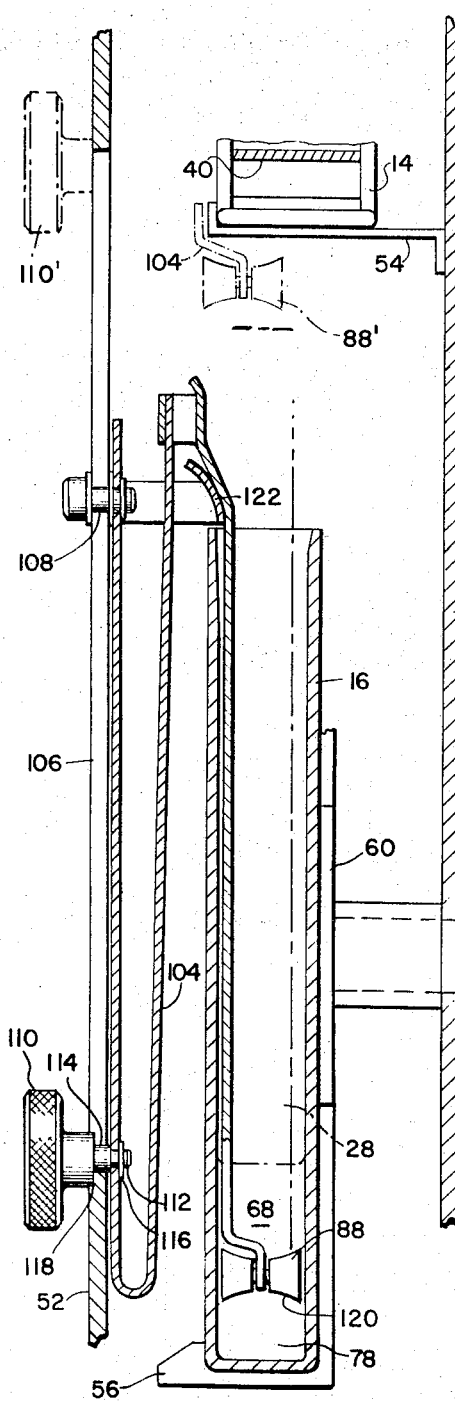
FIG. 4 is a view of the film loop drawing mechanism of the projector taken along line 4—4 of FIG. 2.
Figure 6:
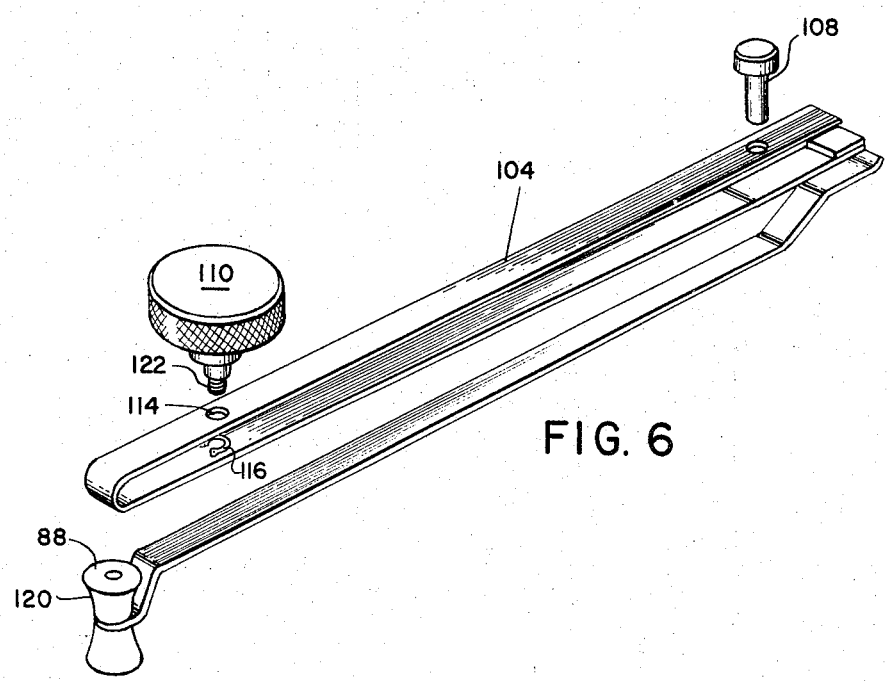
FIG. 6 is a perspective view of the spring component of the projector's film loop drawing mechanism.

Referring now to FIGS. 4 and 6, the idler 88 is rotatably mounted at one end of an S-shaped spring member 104. Slidably positioned through a slot 106, provided in the door 52 of the projector 44, and affixed to the other end of the spring member 104 is a stud 108. A hand knob 110 operable from the exterior of the projector's door 52 includes a pin 112 which passes through the slot 106 and an aperture 114 in the spring member 104 to which it is affixed by a locking ring 116. With one end of the S-shaped spring member 104 fixedly spaced with respect to the door 52 by the stud 108, the natural forces in that member continually tend to pull the hand knob 110 against the door. Consequently, as the spring member is displaced from its initial position (shown in phantom in FIG. 4) to its extended position by moving the hand knob 110 downwardly along the slot 106, the hand knob will automatically seat in a recess 118 provided in the door 52 to lock that member in its fully extended position.

After a loop of film 28 has been drawn from the cassette's film handling section 14 by displacing the hand knob 100 from its initial position to its lowermost position along slot 92 with the projector door 52 open, the door or the projector can be closed and the idler 88 will initially position itself within the drawn loop of film 28 as shown in phantom in FIG. 2. At this time the natural forces within the S-shaped spring member 104 cause the idler 88 to extend partially across the film strip 28 (See FIG. 4). As the hand knob 110 is moved downwardly in the slot 106, the idler 88 contacts the film strip 28 and, as it continues its downward path, its curved roller surface 120 will cause the loop of film strip to slide inwardly on the roller until it is centered thereon. Continuing its downward movement, the idler 88 engages a guide post 122 which extends inwardly from the door 52 of the projector 44 and which urges the idler away from the door permitting it to enter the film developing section 16 of the cassette 10 through its aperture 64. In this manner, the loop of film strip 28 initially drawn from the film gate 36 of the film handling section 14, is additionally passed over and between idlers 83 and 84 and introduced into the reservoir area 78 of the film developing section 16 through its aperture 64. At this point, the loop of film strip 28 drawn from the film gate 36 takes the configuration as shown in FIG. 2 of the drawings.

A specially configured wall member 128 provided with channels 130, 132 also extends from the inner face of the door 52 of the projector 44. After the two sections 14, 16 of the cassette 10 are mounted in the projector 44 and a loop of film strip 28 drawn from the first section, by moving the hand knob 100 to its lowermost position, closing of the door 52 will cause the wall member 128 to enclose a section 129 of the film strip. In this respect the wall member 128 seats against a gasket member 134 mounted on the projector's rear panel 48 to define a drying station 136 into which the film strip 28 enters through channel 130 and from which it exits through channel 132.

An air blowing and heating unit 138 is mounted on the exterior of the projector's rear panel 48 and communicates with the interior of the drying station 136 through duct 140. By energizing the heating and blowing unit 138, warm air can be introduced through the duct 140 into the drying station 136, to impinge upon the film strip section 126, and then exhausted from the drying station through a port 142 in the projector's rear panel 48.

Referring again to FIG. 2, it will be seen that, after the loop of film strip 28 leaves the drying station 136, it passes over idler 82 in re-entering the film handling section 14 onto take-up reel 20. Appropriately positioned on the rear panel 48 of the projector are certain components of its optical system, i.e., a mirror 144 and a back lens 146. When the film handling section 14 of the cassette 10 is mounted in the spring clamps 54, the mirror 144 is positioned within the recess 42 behind the film strip 28 while the back lens 146 is positioned on the other side of the film strip in operable relationship with the mirror and the film strip. The optical system of the projector 44 further includes a second mirror 148 and a front lens 150, the latter element being in register with a flanged opening 152 provided in the frame member 46. A dust cap 154 snugly seats on the flanged opening 152 of the projector 44.

A light source 156 mounted on the rear panel 48 (See FIGS. 2 and 5) directs light through an opening 158 to the mirror 144 from which it is reflected through the film strip 28, through the back lens 146 onto the mirror 148 and thence through the front lens 150 and out the projector's flanged opening 152.

As may also be seen in FIG. 2, the reel means of the cassette's film handling section 14 includes a spur gear 160 connected to a pinion 162 on the take-up reel 20. When the film handling section 14 is mounted in the projector 44, a recess 164 of the spur gear 160 receives a drive shaft 166 extending from the projector's rear panel 48 and rotatably mounted thereto. The drive shaft 166 in turn is connected to a motor 168 of the projector 44 by a pulley 170. The drive shaft 166 also supplies power, through a pulley 172, a wheel 174 mounted from the rear panel 48, and a claw member 176 eccentrically mounted on the wheel 174 and adapted to engage sprocket holes 178 of the film strip 28, to intermittently advance the film strip across the film gate 36. Additionally, as is conventional, a rotating blade shutter (not shown) is mounted to the projector's rear panel 48, so as to be disposed between the light source 156 and the mirror 144 and geared or otherwise appropriately connected to the mechanism driving the claw member 176. Support for the claw member 176 is provided by a guide member 182 and a spring 184 mounted on the rear panel 48 of the projector 44. A conventional clutch 186 cooperating with the drive shaft 166 provides means for selectively engaging the spur gear 160 of the film handling section 14 and the claw member 176 with the projector's motor 168.

Also, when the cassette's film handling section 14 is mounted in the spring clamps 56, a recess 188 of the supply reel 18 receives a drive shaft 190 rotatably mounted to the projector's rear panel 48. This drive shaft is connected to the motor 168 through a conventional clutch 192 by a pulley 194.

It will be recognized that, with clutch 186 engaged and clutch 192 disengaged, the motor 168 may be energized to drive the take-up reel 20, whereby the film strip 28 will be drawn from the supply reel 18 across the film gate 36 onto the take-up reel 20. Simultaneously, the claw member 176 will engage the sprocket holes 178 of the film strip 28 to provide intermittent movement of the film across the projector's optical system as is conventional and the shutter operated in synchronization therewith. Also, by proper manipulation of the hand knobs 100 and 110, a loop of the film strip 28 can be passed through the reservoir area 78 of the cassette's developing section 16 and the drying station 136 of the projector 44 as it passes across the film gate 36 and prior to its coming into operable relationship with the projector's optical system and then being coiled on the take-up reel 20.

With the clutch 186 disengaged and the clutch 192 engaged, the motor 168 can be energized to return the film strip 28 from the take-up reel 20 to the supply reel 18.

OPERATION OF THE PREFERRED EMBODIMENT

To summarize the operation of the preferred embodiment of this invention, the cassette 10 with its film handling section 14 and film developing section 16 connected together by pieces of tape 12 is adapted to be quickly mounted in a motion picture camera. The reel means of the film handling section 14 engages the camera's drive means whereby an operator can selectively record images on the film strip 28 as it traverses the film gate 36 in passing from the supply reel 18 to the take-up reel 20. During the picture-taking operation, the film 28 is supported across the film gate 36 by the removable pressure plate 38. After the film strip 28 has been completely exposed, the cassette 10 can be quickly removed from the camera and replaced, when desired, by an identical cassette containing unexposed film.

After exposure, the tapes 12 can be removed from the cassette 10, to separate its film handling section 14 from its film developing section 16, and the pressure plate 38 removed from the former section. These sections 14 and 16 can then be independently mounted in the spring clamps 54 and 56, respectively, of the projector 44 and the door 52 closed. Turning a toggle switch 195 mounted on the outside of the projector's rear panel 48 to its "on" position engages clutch 192 and energizes the motor 168 whereby the exposed film strip 28 is returned to the supply reel 18. Conventional means automatically returns the toggle switch 195 to its "off" position when the film strip 28 is completely coiled on the supply reel 18.

By then opening the door 52 and displacing the hand knob 100 to its lowermost position on the projector 44, the idler 86 will engage the section of film strip 28 disposed across the film gate 36 and draw a loop thereof from the cassette's film handling section 14. Closing of the door 52 at this time defines the drying station 136 enclosing the section 129 of the film strip 28 and positions the idler 88 within the drawn loop of film strip. The hand knob 110 can then be displaced to its lowermost position on the projector 44 to draw a section of the loop of film strip 28 through the aperture 64 of the cassette's developing section 16 and into the reservoir area 78 thereof. For reasons which will become obvious, the film strip 28 should include a non-photosensitive leader section approximately equivalent in length to that portion of the film strip between the idler 32 of the film handling section 14 and the take-up reel 20 when the separate sections 14 and 16 of the cassette 10 are mounted in the projector 44 and the hand knobs 100 and 110 displaced to their lowermost positions (See FIG. 2).

The dust cap 154 should be removed from the flanged opening 152 and a projection screen (not shown) appropriately positioned in front of the flanged opening. The solenoid 76 and the air heating and blowing unit 138 are simultaneously energized by throwing a toggle switch 196, provided on the exterior of the rear panel 48 of the projector 44, from its "off" position to its "on" position. When energized, the solenoid 76 drives the plunger 74 through the weakened portion 66 of the cassette's developing section 16 and into contact with the glass vial container 70 which is instantaneously crushed thereby. The development chemicals 68, initially retained in the container 70, then flow through the mesh 72 into the reservoir area 78 of the development section 16 and, consequently, come into contact with a portion of the film strip 28.

After the air heating and blowing unit 138 has been energized and the development chemicals 68 have had sufficient time to fill the reservoir area 78 of the cassette's film developing section 16, a conventional time delay circuit connected to the toggle switch 196 engages the clutch 186, and energizes both the motor 168 and the light source 156. Consequently, in this mode, the film strip 28 is drawn from the supply reel 18 through the development chemicals 68 in the reservoir area 78 of the cassette's developing section 16, through the drying station 136 and between the mirror 144 and the back lens 146 onto the take-up reel 20 of the cassette's film handling section 14. During this operation, intermittent motion is transmitted to the film strip 28 as it passes in front of the mirror 144 by the claw member 176.

As the film 28 passes through the development chemicals 68 in the reservoir area 78, the latent images recorded thereon are developed and, as the developed film progresses through the drying station 136, the excess liquid chemicals are evaporated therefrom. As the film strip passes in front of the mirror 144, which receives light from the light source 156, the developed images are projected by these and the other elements of the optical system, i.e., back lens 146, mirror 148 and front lens 150, through the flanged opening 152 of the projector 44 onto the aforementioned screen where they can be viewed. Consequently, a highly compact and efficient system is provided for sequentially and simultaneously developing, drying and projecting motion picture film.

Conventional means (not shown) are connected to the toggle switch 196 to return that element automatically to its "off" position when all of the film 28 has been uncoiled from the supply reel 18. Thus, at this point, the clutch 186 is disengaged and the air heating and blowing unit 138, the motor 168, the light source 156 and the solenoid 76 deenergized. The plunger 74 automatically returns to its original position.

The dust cover 154 may be repositioned on the flanged opening 152 and the idler 88 returned to its original position by drawing the hand knob 110 out of the recess 118 and moving it to its uppermost position along the slot 106. The projector door 52 may then be opened and the idler 86 returned to its initial position by drawing the hand knob 100 out of the recess 94 and moving it to its uppermost position along slot 92. For obvious reasons the end of the film strip attached to the supply reel should consist of a non-photosensitive leader substantially the same length as that on the end attached to the take-up reel 20. With the door 52 opened, the take-up reel whould be manually rotated to draw the non-photosensitive leader taut across the film gate 36 of the cassette's film handling section 14.

The door 52 should then be closed and the toggle switch 195 again returned to its "on" position to rewind the film strip 28 onto the supply reel 18. As previously explained, when the film strip 28 is completely coiled on the supply reel 18, the toggle switch 195 automatically returns to its "off" position de-energizing the motor 168 and disengaging the clutch 192.

At this time the hand knob 61 should be turned to effect a rotation of the cassette's film developing section 16 within the projector 44 whereby the development chemicals 68 are brought into contact with the absorption pad 80 for permanent and safe retention therein. The door 52 can be opened and the cassette's film developing section 16 removed from the spring clamps 56 and disposed of as desired. The cassette's film handling section 14 can be removed from the spring clamps 54 and permanently retained for subsequent viewings.

For additional viewings of the exposed and developed film in the film handling section 14, it is only necessary to again mount the film handling section in the spring clamps 54, to shut the door 52 and to move a toggle switch 198 (mounted on the rear panel 48) to its "on" position. In this position, the clutch 186 is engaged and only the motor 168 and the light source 156 energized. The film strip 28 is then drawn by the take-up reel 20 and the claw member 176 directly across the film gate 36 for projection purposes only. Again, when the film strip 28 is completely coiled on the take-up reel 20, the switch 198 automatically returns to its "off" position disengaging clutch 186 and de-energizing the motor 168 and the light source 156. By then moving toggle switch 195 to its "on" position, the film will be returned to the supply reel 18 and the cassette's film handling section 14 can be removed from the projector 44 and stored as desired.

Editing of the developed film strip 28 can easily be effected. It is only necessary to draw a loop of the film strip 28 from the film gate 36 and to remove sections therefrom or to splice sections thereinto as desired.

Those familiar with the motion picture arts will readily appreciate the novel and highly unique advantages of this motion picture system. A compact cassette structure is provided which is usable in both a camera, during exposure operations, and in a unique projector, for processing and/or projection operations. The processing and developing operations are effected simultaneously. The development chemicals are permanently stored with the film prior to the processing operation which assures compatibility between the development chemicals and the particular film employed. Additionally, the development chemicals are continually retained in the cassette structure itself in a hazard-free manner. Still further, the film can be quickly and simply edited without removing it or detaching it from its permanent storage container. In an overall seanse and most importantly, this invention permits even the amateur photographer to view his motion pictures in an extremely short period of time after they have been taken.

This invention may be practiced or embodied in other ways without departing from the spirit or essential character thereof. For instance, the idlers 86 and 88 can be connected by a suitable mechanism such that the manual movement of a single hand knob will effect their simultaneous displacement from initial to fully extended positions. Alternately, this same operation can be completely automated. Also, the solenoid 76 and its plunger 74 can be replaced with other means, such as a prong extending from an innerface of the projector's rear panel 48, to rupture the container 70 as it is initially mounted in the spring clamps 56 of the projector. While in the illustrated embodiment of the invention the natural forces of the spring member 104 themselves cause the idler 88 to extend partially across the film strip 28, an elongated offset guide post may be employed such that this idler is initially restrained against the guide post in the desired position by the forces in the spring member. The preferred embodiment described herein is therefore illustrative and not restrictive, the scope of the invention being indicated by the appended claims and all variations which come within the meaning of the claims are intended to be embraced therein.

I claim:

1. A motion picture film development device comprising:
   a housing;
   a container positioned within said housing for initially releasably storing processing fluid for said film;
   a reservoir section within said housing into which said fluid may flow when released from said container;
   access means in said housing for introducing a loop of said film in an exposed undeveloped condition into said reservoir section; and an absorption material positioned within said housing which is initially out of contact with said fluid when said reservoir section is filled therewith and which can subsequently be brought into contact with said fluid by reorienting the position of said device.

2. The device of claim 1 wherein said absorption material is positioned above the highest level of said fluid in said reservoir section when said film is being introduced thereinto.

3. The device of claim 1 wherein said container is positioned between said access means and said absorption material.

\* \* \* \* \*